United States Patent
Lee et al.

(10) Patent No.: US 9,937,961 B2
(45) Date of Patent: Apr. 10, 2018

(54) MOUNTING DEVICE FOR SUB-FRAME

(71) Applicant: Hyundai Motor Company, Seoul (KR)

(72) Inventors: Yunjeong Lee, Hwaseong-si (KR); Jae Woo Joung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/372,332

(22) Filed: Dec. 7, 2016

(65) Prior Publication Data

US 2018/0015960 A1   Jan. 18, 2018

(30) Foreign Application Priority Data

Jul. 18, 2016   (KR) .......................... 10-2016-0090902

(51) Int. Cl.
| | | |
|---|---|---|
| *B62D 27/00* | (2006.01) | |
| *B62D 27/02* | (2006.01) | |
| *F16B 39/22* | (2006.01) | |
| *B29C 70/80* | (2006.01) | |
| *B29C 70/84* | (2006.01) | |
| *B29K 105/04* | (2006.01) | |
| *B29L 31/30* | (2006.01) | |

(52) U.S. Cl.
CPC ............ *B62D 27/023* (2013.01); *B29C 70/80* (2013.01); *B29C 70/845* (2013.01); *F16B 39/225* (2013.01); *B29K 2105/04* (2013.01); *B29L 2031/3005* (2013.01); *B60Y 2410/124* (2013.01)

(58) Field of Classification Search
CPC ............ B23K 37/047; B23K 2201/006; B23K 37/04; Y10T 29/49895; B62D 21/11; B60G 2204/143; B60G 2206/60; B60G 7/02; B60G 2200/154; B60G 2204/1431

USPC .......................................................... 296/29
See application file for complete search history.

(56) References Cited

U.S. PATENT DOCUMENTS

| | | | | |
|---|---|---|---|---|
| RE18,457 E | * | 5/1932 | Lord ..................... | F16F 1/3814 |
| | | | | 105/452 |
| 4,531,761 A | * | 7/1985 | von Sivers ........... | B60G 99/004 |
| | | | | 267/293 |

(Continued)

FOREIGN PATENT DOCUMENTS

| | | |
|---|---|---|
| JP | 06-329047 A | 11/1994 |
| JP | 11-334644 A | 12/1999 |

(Continued)

*Primary Examiner* — Kiran B Patel
(74) *Attorney, Agent, or Firm* — Morgan, Lewis & Bockius LLP

(57) ABSTRACT

A mounting device for a sub-frame may include a mounting bracket positioned to correspond with a one side penetration opening formed at a front side inside member of the front side member, a reinforce panel provided to an upper surface of the front side inside member, a mounting bolt separated with a bolt part and a head by a flange which is positioned at a center thereof, joined to a circumference of a bolt opening of the mounting bracket through the flange on a state that the bolt part is inserted into the bolt opening of the mounting bracket, and joined on a state that the head is wedged through the penetration opening of the front side inside member to the welding opening of the reinforce panel, and a foam filler foamed by a heat treatment and filled in a space formed by the front side inside member, the mounting bracket, the reinforce panel, and a front side outside member.

11 Claims, 4 Drawing Sheets

(56) References Cited

U.S. PATENT DOCUMENTS

| | | | | |
|---|---|---|---|---|
| 4,783,039 A * | 11/1988 | Peterson | ............... | B60G 99/004 248/634 |
| 4,861,182 A * | 8/1989 | Gillet | ................... | F16B 37/043 403/264 |
| 4,921,203 A * | 5/1990 | Peterson | ............... | B60G 99/004 248/635 |
| 5,040,917 A * | 8/1991 | Camuffo | ................ | B62D 21/09 403/408.1 |
| 5,248,134 A * | 9/1993 | Ferguson | ............. | B60G 15/068 188/321.11 |
| 5,743,509 A * | 4/1998 | Kanda | ...................... | F16F 1/38 248/634 |
| 5,842,677 A * | 12/1998 | Sweeney | ............... | F16F 1/3835 248/56 |
| 5,954,467 A * | 9/1999 | Paisley | ................... | B60R 22/22 296/30 |
| 6,349,953 B1 * | 2/2002 | Yoshihira | .................. | B60G 7/02 280/124.109 |
| 6,375,221 B1 * | 4/2002 | Kudou | .................... | B60G 7/02 280/124.1 |
| 6,394,537 B1 * | 5/2002 | DeRees | ............... | B62D 29/048 296/191 |
| 6,431,602 B1 * | 8/2002 | Ralko | ..................... | B60K 5/12 280/781 |
| 6,776,566 B2 * | 8/2004 | Kobusch | ............... | F16B 5/0283 411/432 |
| 6,869,090 B2 * | 3/2005 | Tatsumi | .................. | B60G 3/20 280/124.109 |
| 6,869,136 B2 * | 3/2005 | Igarashi | ............... | B62D 27/023 296/204 |
| 7,380,829 B2 * | 6/2008 | Kishima | .............. | B62D 21/155 180/232 |
| 7,389,977 B1 * | 6/2008 | Fernandez | .............. | F16F 3/087 267/141.2 |
| 7,654,543 B2 * | 2/2010 | Tanaka | ..................... | B60G 7/02 180/312 |
| 7,695,039 B2 * | 4/2010 | Sakamoto | ............... | B60R 13/06 296/1.08 |
| 8,246,104 B2 * | 8/2012 | Ohkubo | ............... | B62D 25/2036 296/187.08 |
| 8,454,290 B2 * | 6/2013 | Schaser | ................. | F16B 5/0241 248/576 |
| 9,139,237 B1 * | 9/2015 | Ganti | ................... | B62D 33/077 |
| 9,469,344 B2 * | 10/2016 | Haselhorst | ............. | B62D 21/11 |
| 2001/0052713 A1 * | 12/2001 | Kim | ....................... | B62D 24/02 296/35.1 |
| 2012/0313399 A1 * | 12/2012 | Caliskan | ............... | B62D 25/20 296/193.01 |
| 2014/0097635 A1 * | 4/2014 | Kim | ....................... | B62D 21/02 296/29 |
| 2017/0008564 A1 * | 1/2017 | Nam | ....................... | F16B 35/00 |
| 2017/0173724 A1 * | 6/2017 | Choi | ...................... | B23K 11/0053 |

FOREIGN PATENT DOCUMENTS

| | | |
|---|---|---|
| JP | 2000-074552 A | 3/2000 |
| JP | 2013-067235 A | 4/2013 |
| KR | 10-2005-0028771 A | 3/2005 |
| KR | 10-0521943 B1 | 10/2005 |
| KR | 10-2013-0070363 A | 6/2013 |

* cited by examiner

MOUNTING DEVICE FOR SUB-FRAME

CROSS-REFERENCE TO RELATED APPLICATION

The present application claims priority to Korean Patent Application No. 10-2016-0090902 filed on Jul. 18, 2016, the entire contents of which is incorporated herein for all purposes by this reference.

BACKGROUND OF THE INVENTION

Field of the Invention

The present invention relates to a mounting device for a sub-frame, and more particularly to a mounting device for a sub-frame which fixes the mounting bolt by filling foam filler in an inside space of a mounting bracket into which a mounting bolt is inserted on the whole.

Description of Related Art

In general, a sub-frame is assembled to a lower portion a front side member in a monocoque vehicle body structure so as to functions to mount or support components such as an engine and a transmission.

In addition, the sub-frame induces that an engine and a transmission are dropped in a head-on collision of a vehicle so as to prevent that the engine or the transmission are entered into the inside of a vehicle as passing through a dash panel of a vehicle body, ensuring safety of passenger.

Both front and rear sides of the sub-frame are assembled by a mounting device for a sub-frame being provided to lower portions of both front side members of a vehicle.

In this regard, the mounting device for a sub-frame includes mounting bolts which are fixed to four portions, that is, both sides of respective both the front and the rear of the front side member by a mounting bracket to fix the sub-frame to the lower portion of the front side member.

Herein, the mounting bolt is welded on a state of being inserted into a penetration hole which is formed at the mounting bracket.

But, the above mentioned conventional mounting device for a sub-frame has a problem that property of a material of a vehicle body component is changed by heat having a high temperature generated during a welding process.

In addition, the mounting device for a sub-frame also has a problem that a crack may be generated by fault of the welding portion and strength deterioration of a heat affected zone (HAZ) by welding.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a mounting device for a sub-frame having advantages of improving assembly hardness of a mounting bolt and performance of absorbing impact as a head of a mounting bolt is fixed with additional by applying foam filler in an inside space of a mounting bracket into which the mounting bolt is inserted.

Various aspects of the present invention are directed to providing a mounting device for a sub-frame having further advantages of more improving assembly hardness as a plurality of grooves are formed at an outside circumference of the head of the mounting bolt to widen contact area with the foam filler.

According to one or a plurality of exemplary embodiment of the present invention, a mounting device for a sub-frame may be configured to engage a sub-frame to a front side member of a vehicle body. The mounting device for a sub-frame may include a mounting bracket positioned to correspond with one side penetration hole formed at a front side inside member of the front side member to form a bolt hole at one side thereof to correspond with a lower portion of the penetration hole in a vertical direction, a reinforce panel provided to an upper surface of the front side inside member to form a welding surface to correspond with the penetration hole by being upwardly protruded and form a welding hole to correspond with an upper portion of the penetration hole in a vertical direction on the welding surface, a mounting bolt separated with a bolt part and a head by a flange which is positioned at a center thereof, joined to a circumference of the bolt hole through the flange on a state that the bolt part is inserted into the bolt hole of the mounting bracket, and joined on a state that the head is wedged through the penetration hole of the front side inside member to the welding hole of the reinforce panel, and a foam filler foamed by a heat treatment and filled in a space formed by the front side inside member, the mounting bracket, the reinforce panel, and a front side outside member.

A plurality of grooves may be formed at an outside surface of the head of the mounting bolt.

The plurality of grooves may be formed at an outside surface circumference of the head to be arranged with a set gap along a longitudinal direction of the head.

The grooves may be formed by a rolling of rod.

The flange may be joined by a projection welding on a state of being supported to a circumference upper surface of the bolt hole of the mounting bracket.

The welding surface of the reinforce panel may be formed with a flat surface to form a right angle with respect to a vertical direction that the mounting bolt is assembled.

The head of the mounting bolt may be full-field welded on a state of being supported to a circumference lower surface of the welding hole on the welding surface of the reinforce panel through a stepped surface formed at an upper end portion thereof.

The full-field welding may be a $CO_2$ welding.

The foam filler may be foamed and hardened by heat having a high temperature on a state of being spread as a liquid over one side of the space to fill the space.

The foam filler may contain an epoxy resin.

The foam filler may form a soft portion layer therein along a circumference thereof of the mounting bolt and form a hardened portion layer except the soft portion layer.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
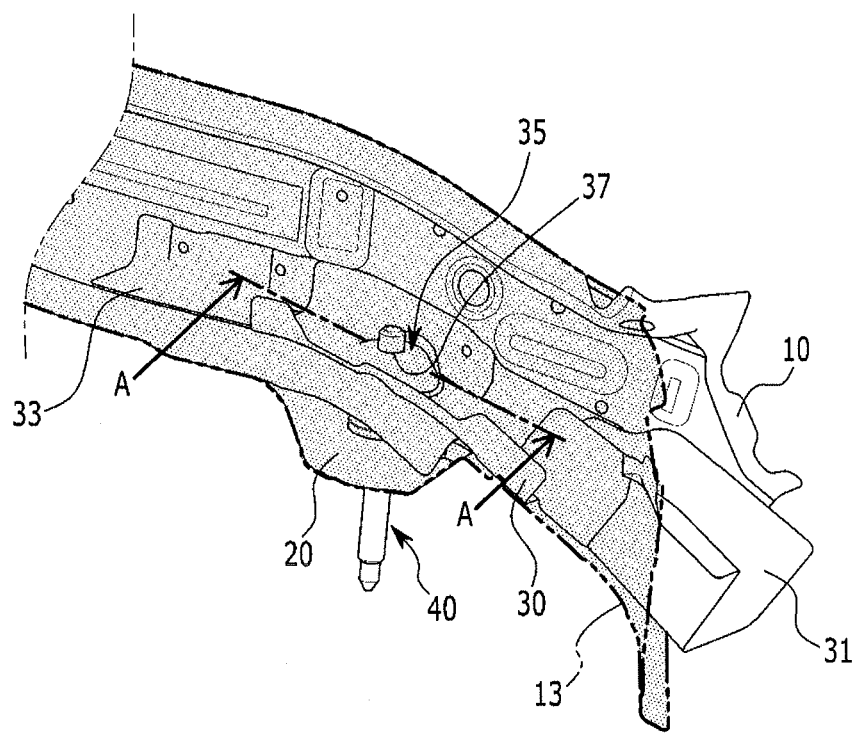
FIG. 1 is a partial projected perspective view of a front side member applying a mounting device for a sub-frame according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
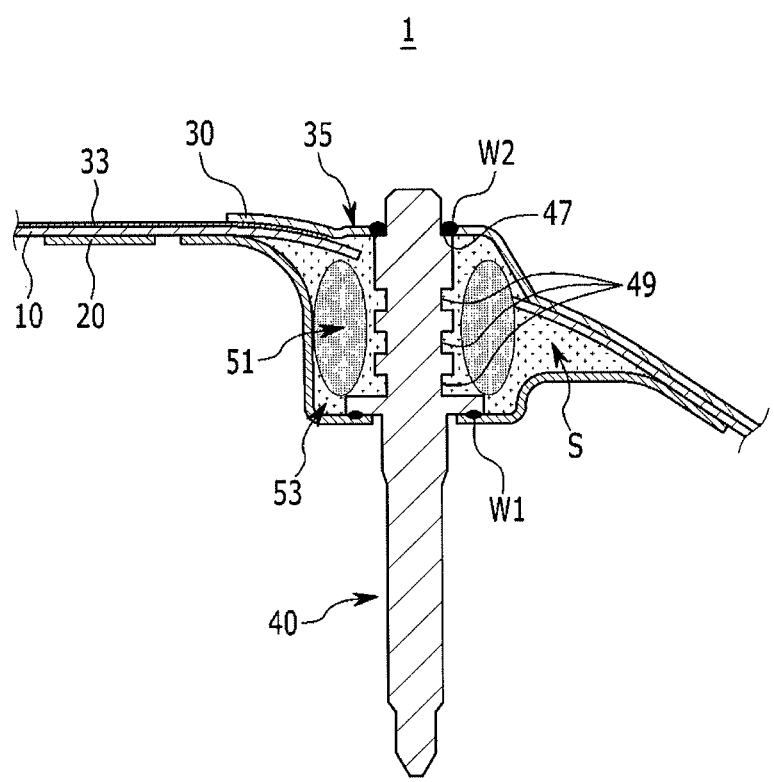
FIG. 2 is a cross-sectional view along a line A-A of FIG. 1.
Figure 3:
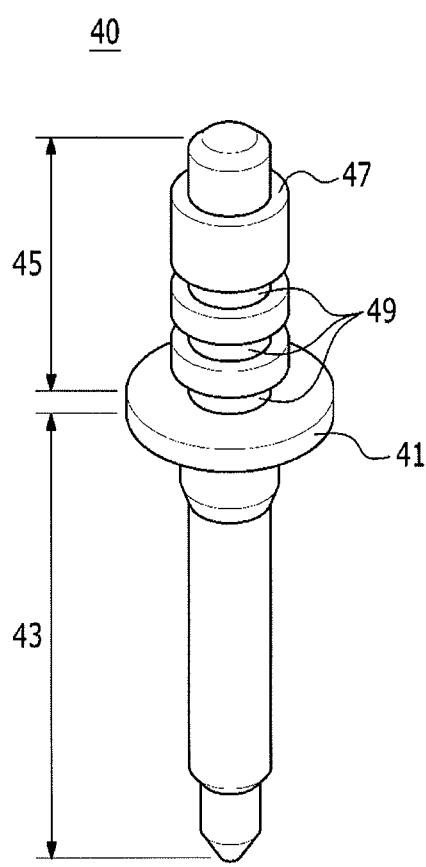
FIG. 3 is a perspective view of a mounting bolt being applied to a mounting device for a sub-frame according to an exemplary embodiment of the present invention.

FIG. 1 is a partial projected perspective view of a front side member applying a mounting device for a sub-frame according to an exemplary embodiment of the present invention, FIG. 2 is a cross-sectional view along a line A-A of FIG. 1, and FIG. 3 is a perspective view of a mounting bolt being applied to a mounting device for a sub-frame according to an exemplary embodiment of the present invention.

A mounting device 1 for a sub-frame according to an exemplary embodiment of the present invention is applied for engaging a sub-frame to a front side member of a vehicle body.

The front side member includes a front side inside member 10 and a front side outside member 13.

That is, the mounting device 1 for a sub-frame is a device for fixing a sub-frame which supports and mounts a power train including an engine and a transmission, it is substantially required to strongly couple a side member of a vehicle body and the sub-frame and as a great load is continuously applied to the mounting device 1 for a sub-frame while a vehicle is driven.

Referring to FIG. 1 and referring to FIG. 2, the mounting device 1 for a sub-frame includes a mounting bracket 20, a reinforce panel 30, a mounting bolt 40, and a foam filler 50.

Firstly, the mounting bracket 20 is provided to a lower surface of the front side inside member 10 to be positioned to correspond with one side penetration hole 11 formed at the front side inside member 10.

In addition, the mounting bracket 20 forms a bolt hole 21 at one side thereof to correspond with a lower portion of the penetration hole 10 in a vertical direction.

A center portion of the mounting bracket 20 is convexly formed in downward, and the mounting bracket 20 is joined to the front side inside member 10 through a join portion which is bent toward an outside along one side edge portions.

The reinforce panel 30 is provided to an upper surface of the front side inside member 10, and the front and the rear of the reinforce panel 30 are respectively connected with a front reinforce panel 31 and a rear reinforce panel 33 to reinforce hardness.

In addition, the reinforce panel 30 forms a welding surface 35 which is upwardly protruded to correspond with one side penetration hole 11 of the front side inside member 10.

In this regard, the welding surface 35 forms a welding hole 37 to correspond with an upper portion of the penetration hole 11 in a vertical direction.

The welding surface 35 of the reinforce panel 30 is formed with a flat surface to form a right angle with respect to a vertical direction that the mounting bolt 40 is assembled.

Referring to FIG. 3, the mounting bolt 40 is separated with a bolt part 43 and a head 45 by a flange 41 which is positioned at a center thereof.

The mounting bolt 40 is joined to a circumference of the bolt hole 21 through the flange 41 on a state that the bolt part 43 is inserted into the bolt hole 21 of the mounting bracket 20.

In addition, the mounting bolt 40 is welded on a state that the head 45 is wedged through the penetration hole 11 of the front side inside member 10 to the welding hole 37 of the reinforce panel 30.

In this regard, a stepped surface 47 is formed at an upper end portion of the head 45.

In addition, the mounting bolt 40 forms a plurality of grooves 49 at an outside surface the head 45.

The plurality of grooves 49 are formed at an outside surface circumference of the head 45 to be arranged with a set gap along a longitudinal direction of the head 45.

The plurality of grooves 49 may be formed by a rolling of rod.

The mounting bolt 40 is joined by a projection welding W1 on a state that the flange 41 is supported to a circumference upper surface of the bolt hole 21 of the mounting bracket 20.

In addition, the mounting bolt 40 is full-field welded on a state of being supported to a circumference lower surface of the welding hole 37 on the welding surface 35 of the reinforce panel 30 through the stepped surface 47 of the head 45.

At this time, the full-field welding may be a $CO_2$ welding W2.

According to an exemplary embodiment of the present invention, it has been described that the mounting bolt 40 is joined to the mounting bracket 20 through the flange 41 by the projection welding W1, and is joined to the reinforce panel 30 through the stepped surface 47 by the $CO_2$ welding W2, but it is not limited thereto, so a welding method having a join hardness to be same with the projection welding W1 or the $CO_2$ welding W2 may be applied.

Figure 4:
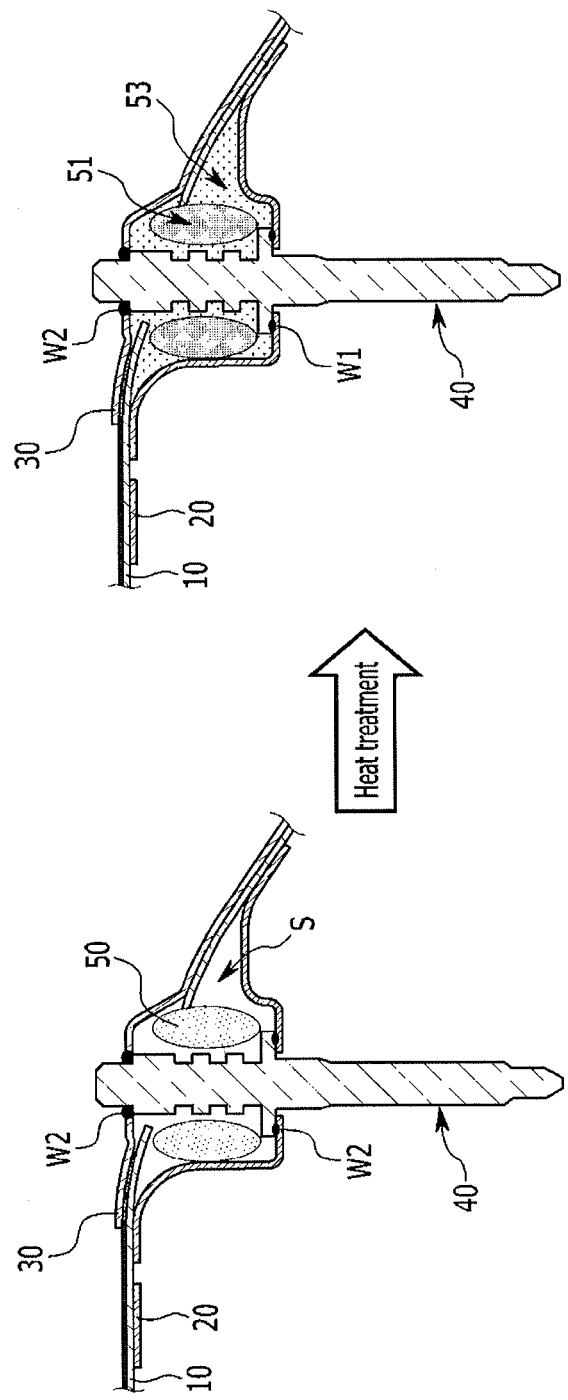
FIG. 4 is a drawing illustrating a process of installing foam filler being applied to a mounting device for a sub-frame according to an exemplary embodiment of the present invention.

FIG. 4 is a drawing illustrating a process of installing foam filler being applied to a mounting device for a sub-frame according to an exemplary embodiment of the present invention.

Referring to FIG. 4, the foam filler 50 is foamed by a heat treatment and is filled in a space S formed by the front side inside member 10, the mounting bracket 20, the reinforce panel 30, and the front side outside member 13.

The foam filler 50 is spread as a liquid over one side of the space S.

Then, the foam filler 50 is foamed and hardened by a heat treatment with a high temperature (i.e., a temperature higher than a predetermined temperature) during passing through an oven to fill the space S.

The filled foam filler 50 forms a soft portion layer 51 therein along a circumference of the mounting bolt 40 by changing property of a material when hardening and forms a hardened portion layer 53 except the soft portion layer 51.

The soft portion layer 51 improves performance of absorbing impact in a collision of a vehicle, and the hardened portion layer 53 improves bind forces between the mounting bolt 40 and the front side inside member 10, the mounting bracket 20, and the reinforce panel 30.

The foam filler 50 contains an epoxy resin having a high toughness and a high strength foaming performance, and a foaming ratio thereof is set with a range of 150%-200% to increasing a volume.

In addition, the foam filler 50 may replace an ordinary welding join, and may increase assembly hardness by supporting and fixing the whole portion of the mounting bolt 40.

Therefore, a mounting device 1 for a sub-frame according to an exemplary embodiment of the present invention may minimize the welding fault as the welding surface 35 of the reinforce panel 30 and the stepped surface 47 of the mounting bolt 40 are joined by welding to form a right angle such that cross-section of the welding portion is increased.

In addition, the mounting device 1 for a sub-frame can improve bind force as the plurality of groove 49 is applied to an outside circumference of the head 45 of the mounting bolt 40 such that contact area with the foam filler 50 is widened.

As a result, durability of the mounting device 1 for a sub-frame may be increased, and Noise, Vibration, Harshness (NVH) performance of a vehicle may be improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mounting device for a sub-frame which is configured to engage the sub-frame to a front side member of a vehicle body, including:
    a mounting bracket positioned to correspond with a one side penetration opening formed at a front side inside member of the front side member to form a bolt opening at a first side thereof to correspond with a lower portion of the one side penetration opening in a vertical direction thereof;
    a reinforce panel provided to an upper surface of the front side inside member to form a welding surface to correspond with the one side penetration opening by being upwardly protruded and form a welding opening to correspond with an upper portion of the one side penetration opening in a vertical direction on the welding surface;
    a mounting bolt separated with a bolt part and a head by a flange which is positioned at a center thereof, joined to a circumference of the bolt opening through the flange on a state that the bolt part is inserted into the bolt opening of the mounting bracket, and joined on a state that the head is wedged through the one side penetration opening of the front side inside member to the welding opening of the reinforce panel; and
    a foam filler foamed by a heat treatment and filled in a space formed by the front side inside member, the mounting bracket, the reinforce panel, and a front side outside member.

2. The mounting device of claim 1, wherein a plurality of grooves are formed at an outside surface of the head of the mounting bolt.

3. The mounting device of claim 2, wherein the plurality of grooves are formed at an outside surface circumference of the head to be arranged with a set gap along a longitudinal direction of the head.

4. The mounting device of claim 2, wherein the grooves are formed by a rolling of rod.

5. The mounting device of claim 1, wherein the flange is joined by a projection welding on a state of being supported to a circumference upper surface of the bolt opening of the mounting bracket.

6. The mounting device of claim 1, wherein the welding surface of the reinforce panel is formed with a flat surface to form a right angle with respect to a vertical direction that the mounting bolt is assembled.

7. The mounting device of claim 6, wherein the head of the mounting bolt is full-field welded on a state of being supported to a circumference lower surface of the welding opening on the welding surface of the reinforce panel through a stepped surface formed at an upper end portion thereof.

8. The mounting device of claim 7, wherein the full-field welding is a CO2 welding.

9. The mounting device of claim 1, wherein the foam filler is foamed and hardened by heat having a high temperature on a state of being spread as a liquid over a first side of the space to fill the space.

10. The mounting device of claim 9, wherein the foam filler contains an epoxy resin.

11. The mounting device of claim 9, wherein the foam filler forms a soft portion layer therein along a circumference of the mounting bolt and forms a hardened portion layer except the soft portion layer.

* * * * *